United States Patent Office 3,298,405
Patented Jan. 17, 1967

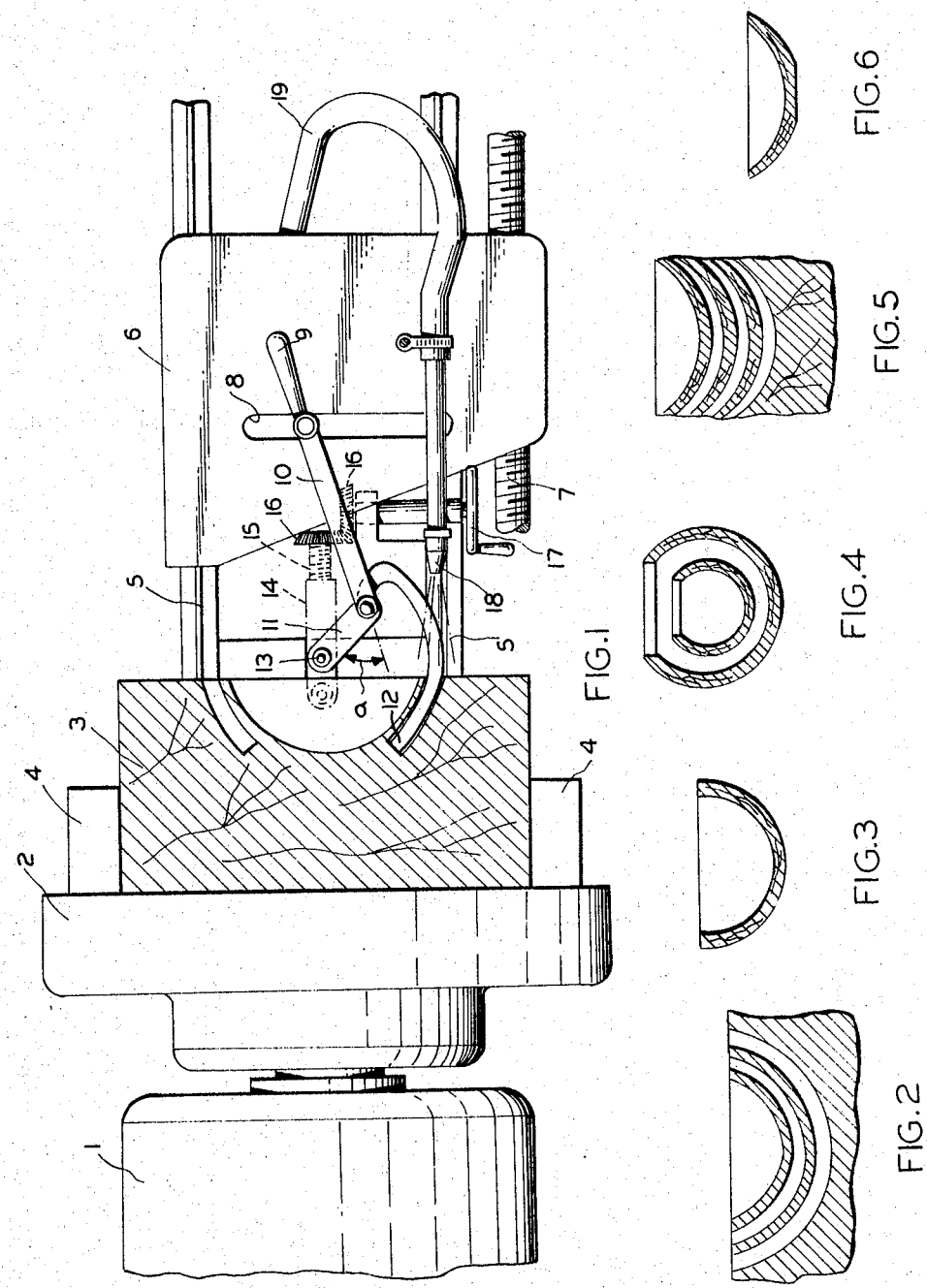

3,298,405
MANUFACTURE OF HOLLOW BODIES
Nils Oskar Tore Loof, Gullspang, Sweden
Filed Aug. 26, 1964, Ser. No. 392,089
7 Claims. (Cl. 142—1)

This application is a continuation in part of my prior application Serial No. 144,345, now abandoned.

This invention relates to the manufacture of hollow bodies and more particularly to a method and a machine for manufacturing from a solid workpiece of e.g. wood a plurality of bowls, curved cross-section plates and similar objects.

Heretofore, in the production of bodies of the kind above referred to it has been the practice to use a lathe by means of the tool of which has been removed all those portions of the initial, normally cylindrical workpiece which are not to be incorporated in the finished subject. This method, of course, means an uneconomical utilization both of the initial material, which is frequency costly—teak and the like is often used—and of the lathe whose precision capabilities are only made use of to a slight degree, since the turning operation is largely comparable with rough-turning. Further, as a well-known matter of fact, in the case of such turning work the time required for turning any given workpiece will be substantially directly proportional to the volumetric amount of the mass of chips removed.

The principal object of the invention is to provide a method of manufacturing hollow bodies at a considerably increased speed in comparison to the methods hitherto used.

Another object of the invention is to provide a method permitting the manufacture of a number of hollow bodies from one and the same workpiece with an exceedingly small amount of waste material.

A further object of the invention is to provide a machine suitable for carrying out the new method.

Other objects of the invention as well as advantages thereof will be apparent from the following description when read in conjunction with the accompanying drawing.

According to the invention use is made of a machine which may in its general design be defined as a lathe and which is equipped with a parting tool swingably mounted around a pivot. Preferably, that pivot is displaceable along the axis of rotation of the workpiece which may in the normal manner be supported by a chuck or any corresponding device. According to a further feature of the invention said tool is mounted on a holder arranged to be readily replaceable.

In the drawing:

FIG. 1 is a diagrammatic partial view of a lathe equipped with an arrangement according to the invention.

FIG. 2 illustrates the operation of manufacturing a plurality of workpieces equal in shape but different in size.

FIG. 3 shows a manufactured hollow body spanning a solid angle slightly in excess of 180 degrees.

FIG. 4 shows how, according to the invention, it is possible to obtain hollow bodies spanning solid angles substantially in excess of 180 degrees.

FIG. 5 illustrates the production of a plurality of congruent hollow bodies (i.e. identical in both shape and size).

FIG. 6 is a sectional elevation through one hollow body as obtained according to FIG. 5.

Designation 1 relates to the headstock of the lathe and designation 2 to a chuck, clamping plate or the equivalent carried by the lathe spindle and holding a workpiece 3 clamped between jaws 4. Numeral 5 designates the two guides of the lathe bed along which the carriage 6 is displaceable in the conventional manner, as by means of a leadscrew 7. The carriage is provided with a transversely extending slot 8. Passing through the latter is a bolt which can be clamped in different positions of adjustment by means of a handle 9 and about which one end of a link 10 is pivotally mounted. The opposite end of the link 10 is articulated to a holder 11 for the turning tool 12 which is of the parting type. This holder is constituted by a suitably straight inner portion and an arcuate outer portion. The inner end of the holder is swingably mounted on a pivot 13. The latter is secured to a slide 14 which is displaceable in the same direction as the carriage 6 by means of a spindle 15, a bevel gearing 16 and a handwheel 17. The pivot axis 13, in the present instance, intersects the axis of rotation of the workpiece 3.

Hereinafter the method of the invention will be described in principle, simultaneously setting forth the operation of the corresponding machine.

Assuming first that it is desired to produce a series of hollow bodies equal in shape but different in size, for instance as shown in FIGS. 2, 3 or 4. In that case the position of the pivot axis 13 of the tool holder is maintained unchanged, but on the other hand the tool holder, after the completion of each turning operation, i.e. after the production of each hollow body, will have to be replaced by one having a different radius of rotation. Normally, this would preferably be accomplished by using tool holders of progressively greater radii of rotation, although it will be understood that the reverse procedure is also possible. The end of the connecting link 10 remote from the workpiece is first adjusted to such a position along the slot 8 as to cause the link 10 to extend at the smallest possible angle $a$ relative to the inner portion of the tool holder when the latter is in either of its two extreme positions. The tool is then fed into the workpiece by moving the carriage towards the latter. After a workpiece has been removed, the tool holder is replaced by the next succeeding one, and the procedure just described is repeated. To enable the advantages of the invention to be fully utilized, the arrangement described hereinbefore is suitably supplemented by a nozzle 18 which is supplied with air under pressure through a hose 19 and is adapted to direct the air jet into the groove adjacent to the turning tool in order to cool the latter and continuously to remove the chips formed by the tool.

As shown in FIG. 4 it is possible according to the invention, somewhat surprisingly, also to produce hollow bodies spanning a solid angle substantially in excess of 180 degrees, provided only that the largest outer diameter of any given hollow body is smaller than the opening diameter of the next-larger hollow body.

Assuming now that, on the other hand, the production of a plurality of hollow bodies identical in both shape and size (i.e. congruent bodies) is desired. This is carried out in a manner which is, in principle, the reverse one to that just described, i.e. instead of varying the pivot radius of the tool holder and maintaining constant the position of its pivot axis, one operates all the time with one tool holder having a pivot radius of constant length, and displaces at progressive intervals the position of its pivot centre relative to the workpiece. FIG. 5 illustrates the operating principle pertaining to this embodiment of the invention.

As illustrated in the drawing, the turning tool can be caused to penetrate into the workpiece either from its flat end face, as shown in FIGS. 1 to 4, or from its peripheral surface, as shown in FIG. 5. As will appear most clearly from FIG. 2, a combination of these two procedures of operation will also be possible. Further, it may be suitable in certain cases to position the pivot axis or shaft 13 of the tool holder more or less offset laterally from the axis of rotation of the workpiece, whereby there will be produced a hollow body exhibiting a central, inwardly or outwardly curved portion. Finally, it is also possible, of course, to carry out a plurality of turning operations simultaneously, for which purpose the tool holder would be provided with two or more turning tools spaced in side-by-side relation.

What is claimed is:

1. A machine for sequentially manufacturing a plurality of wooden bowls from a block of wood comprising:
   (a) a base,
   (b) a holding means mounted on said base for holding said block of wood and rotating it about a fixed axis of rotation,
   (c) a first pivot means mounted on said base adjacent said axis of rotation,
   (d) cutting tool means having one end pivotally connected to said first pivot means to pivot on a first pivot axis normal to said axis of rotation and the opposite end forming an arc defining a circle about said pivot axis and terminating in a sharpened cutter,
   (e) carriage means slideably mounted on said base to slide toward and away from said holding means parallel to said axis of rotation and carrying an elongated guide perpendicular to said axis of rotation,
   (f) a second pivot means slideably mounted on said guide to slide therealong and clamp in a selected position, and
   (g) a connecting link means having one end pivotally connected to said second pivot means to pivot on a second pivot axis parallel to said first pivot axis and its opposite end pivotally connected to said cutting tool means, at a point intermediate the ends thereof, to pivot on a third pivot axis parallel to said first and second pivot axes.

2. A machine in accordance with claim 1 which additionally includes air jet means mounted on said carriage to blow air into the cut made in said block of wood by said cutting tool means.

3. A machine in accordance with claim 1 wherein the cutting tool means includes a generally straight tool holder having one end connected to the first pivot means and an arcuate cutting element rigidly connected to the free end of said tool holder adjacent the third pivot axis.

4. A machine in accordance with claim 1 wherein the cutting tool means includes a plurality of arcuate ends defining a plurality of circles of differing radius to produce a plurality of bowls in one pass of the tool.

5. A machine in accordance with claim 1 wherein the first pivot means is slideably mounted on the base to slide parallel to the axis of rotation and be clamped in a selected position.

6. A machine in accordance with claim 1 wherein the first pivot means is displaceable toward and away from the axis of rotation.

7. A machine in accordance with claim 1 wherein the guide on the carriage is a slot.

No references cited.

WILLIAM W. DYER, JR., *Primary Examiner.*

W. D. BRAY, *Assistant Examiner.*